Aug. 30, 1938.                G. A. SPELTS                2,128,436
                              CONTROL VALVE
                           Filed Feb. 26, 1936
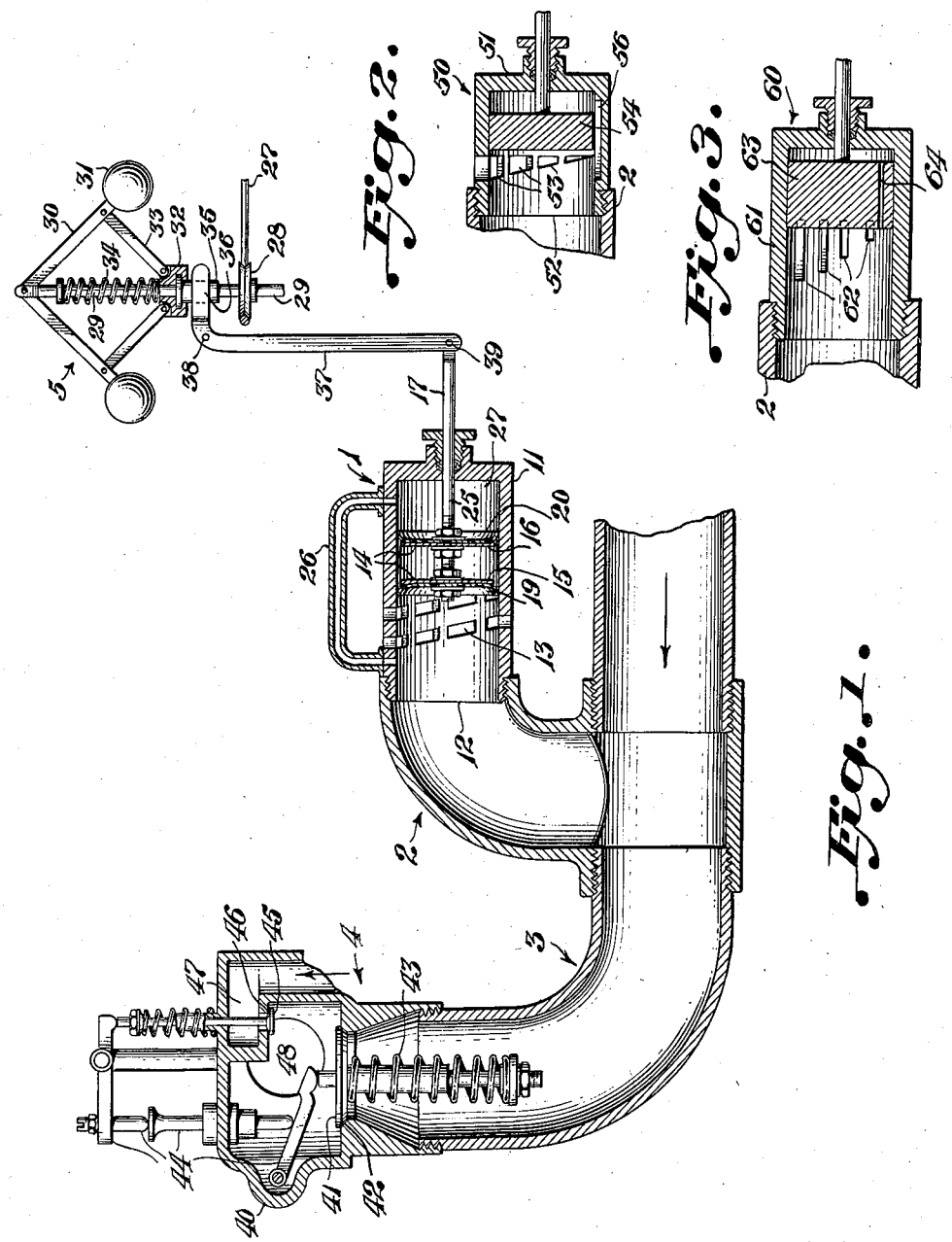
Inventor:
George Allen Spelts Patented Aug. 30, 1938

2,128,436

UNITED STATES PATENT OFFICE 2,128,436

CONTROL VALVE

George Allen Spelts, Los Angeles, Calif., assignor of seven percent to W. F. Arndt and thirty percent to L. J. Styskal, both of Los Angeles County, Calif.

Application February 26, 1936, Serial No. 65,835

7 Claims. (Cl. 123—108)

My invention relates to internal combustion engines in general and to means for controlling the air supply to such engines in particular.

Internal combustion engines of the two cycle type, burning a gaseous fuel are generally controlled by the amount of fuel entering the combustion chamber during each cycle. The power output required to keep the engine speed constant is generally regulated by means of a speed governor regulating the amount of fuel consumed. In this manner the mixture in the combustion chamber can be correct only for one particular power output. At all other loads, the mixture is too lean, if it is assumed that the correct mixture is obtained at full rated power output. This condition exists whether the fuel is introduced in the combustion chamber together with the air or separately, since two cycle engines generally have some method of rear piston compression furnishing a more or less constant supply of air.

It is therefore of great advantage to control the amount of air introduced into the combustion chamber to obtain a proper mixture of fuel and air at any permissible load.

Hence it is an object of my invention to provide means for obtaining a proper combustible ratio of air and fuel to be introduced into the combustion chamber of a two cycle engine.

In general, stationary engines are operated at constant speed. The action of a speed governor may then be utilized to cooperate with the above mentioned means to effect a properly balanced ratio of fuel and air in the combustion chamber.

Accordingly, it is an object of my invention to provide means utilizing the action of a speed governor in conjunction with the above mentioned means for obtaining a proper mixture in the combustion chamber of a two cycle engine, for all permissible loads of the engine.

My invention possesses many other advantages and has other objects which may be more easily apparent from a consideration of several embodiments of my invention. For this purpose I have shown three forms of my invention in conjunction with a two cycle engine. I shall now proceed to describe these forms in detail, which illustrate the general principles of my invention, but it is to be understood that this description is not to be taken in a limited sense, since the scope of my invention is best defined in the subjoined claims.

In the drawing:

Figure 1 represents a view, partly in cross section, of my air control valve in conjunction with the air line and injector mixing valve for mixing fuel and air to form a proper combustible mixture.

Figure 2 represents a longitudinal cross section of another form of my control valve.

Figure 3 represents a longitudinal cross section of a third form of my invention.

Referring now to the drawing in greater detail, I show my control valve 1, joined by a convenient manner such as a T 2 to an air line 3 in which air is urged leftwardly through injector mixing valve 4 in which fuel is injected into the air stream in a manner to be described later. A flyball governor 5 may be used to regulate the action of control valve 1.

Control valve 1 comprises a body 11 which is shaped to form a hollow cylinder open at one end and closed at the other end. The open end 12 is screwed or otherwise cooperatively joined to the T 2. I have provided slots 13 in the body 11 of valve 1. Such slots may be cut in the form of a single or double spiral, or they may be of any other configuration that may be found desirable to obtain a required controlling action. In general, the slope of the slots determines the degree of control obtained. Thus in the case of a slope amounting to 85 degrees with respect to the longitudinal axis of the valve will result in a more rapid control than a slope of 45 degrees can give. This control is obtained as follows.

A balanced piston 14 is slideably fitted in the valve body 11. The piston in this case comprises two discs 15 and 16 mounted on piston rod 17 which protrudes through the closed end of the body 11. A bushing 18 may be provided to prevent leakage. In order to form an airtight slideable contact between the cylinder walls and the piston, I provide leather (or other suitable material) washers 19 and 20 which are also mounted on piston rod 17 and held into close proximity to the discs 15 and 16 respectively by means of nuts on threaded portion 25 of rod 17. The spacing of the discs is determined by the length of the valve body and the length and slope of the slots 13.

I provide an air passage 26 in the form of a tube connecting the open end of the valve body with the closed chamber 27 formed by the body and washer 20. Thus the pressure exerted on washer 20 is equal to that exerted on washer 19. The rod 17 occupies a small area on the face of washer 20 and consequently has little effect. The piston is thus seen as practically balanced, i. e., the piston can be moved by moving rod 17 in either direction with only enough effort to overcome the friction between the walls of the valve body and the two washers, and the friction between rod 17 and bushing 18. The washers may be omitted if discs 15 and 16 fit closely enough.

Governor 5 is shown schematically in the sense that only those parts showing the well known principle of flyball governors are shown. The governor is driven in any well known manner such as by means of a belt 27 which in turn is actuated by a drive wheel on the crankshaft of the engine. The belt drives a wheel 28 mounted on a rotating shaft 29. At the top of shaft 29, several arms 30 are pivotally connected. The other ends of the shafts are connected to as many flyballs 31. Also mounted on shaft 29 is slideable sleeve 32 which can slide along the shaft. Pivotally connected to this sleeve 32 and also to the arms 30 are arms 33. A spring 34 tends to hold sleeve 32 down.

I also provide a collar 35 on sleeve 32 which slides along shaft 29 with sleeve 32 but which does not rotate therewith. A slot 36 is provided in collar 35 to operate lever 37 which may be L shaped as shown and pivoted at 38. Lever 37 is pivotally connected to rod 17 at 39.

At the end of air line 3, I show my injector mixing valve 4 in which gaseous fuel is mixed in correct proportion to the amount of air flowing through the valve to produce a proper, combustible mixture. The mixing valve comprises a body 40. An air valve 41 is normally held against its seat 42 by means of spring 43. A linkage mechanism 44 serves to operate gas valve 45 normally held against its seat 46. Gaseous fuel stands under a predetermined pressure in gas passage 47.

Now as air in pipe 3 rushes into the engine intake 48, it lifts air valve 41 off its seat. The amount of lift and the time the valve remains open is proportional to the amount of air flowing into intake 48. The action of air valve 41 is proportionally repeated by gas valve 45. Thus a proportional amount of gaseous fuel is injected into the mixing valve body 40, to mix with the air and form a proper combustible mixture. Reference is made to my application for Letters Patent, entitled "Injector mixing valve", filed November 4, 1935, Serial Number 48,215, now Patent Number 2,094,829, Oct. 5, 1937, series of 1935, for further details on the mixing valve.

I shall now describe the operation of my invention. Assuming the engine is operating normally at some load less than maximum, and that a state of balance has been reached, air is urged from some source (a blower or the rear piston compression means of most two cycle engines) through air conduit 3. A certain portion is lost through the slots 13 of control valve 1, due to a portion of the slots not being covered by piston 14. The remainder passes through the mixing valve 4 and is mixed with a correct proportion of fuel before it enters intake 48.

Let it be supposed that the load increases. The engine tends to slow down and governor 5 acts to move piston 14 to the left. Thus less air is allowed to escape and more air passes through mixing valve 4, in which proportionally more fuel is added to the air. Consequently, more power is developed. This increase in power tends to offset the increased load. By properly adjusting the mechanical advantage between the governor action and the motion of piston 14, a small change in speed will cause a relatively large motion of piston 14. In addition, if the slope of slots 13 is steep, a very fine degree of control is obtained. A 25 H. P. natural gas engine provided with my control valve has been tested and the speed only varied from 210 R. P. M. at no load to 205 R. P. M. at full load. Link 37 may be replaced with a more complicated linkage system giving a larger advantage without changing the principle of my invention. In some cases it may be desirable to reduce engine speed with an increase in load. The right degree of control can be provided by designing the proper ratio of governor action to piston movement, in conjunction with the slope of slots 13.

In Figure 2, I show a somewhat different form of my control valve 50, which has a main body 51 provided with open end 52 which is suitably joined to T 2.

A single opening 53 allows air to escape in proportion to the area not covered by piston 54. In this case, the piston is in such a position as to allow practically all the air to escape, and the engine will idle under no load. The piston 54 is shown as a solid piston. A groove 56 in the main valve body 51 serves to equalize the air pressure on both sides of the piston 54.

I also show a third form of my invention in Figure 3. The valve 60 having a main body 61 is provided with a series of openings 62. The left hand end of the openings are staggered, so that as the piston moves leftwardly an increased control is obtained. In this case I show solid piston 63 provided with an equalizing duct 64.

In all cases, the piston will completely shut the air escape openings when in the extreme left position. The air openings and length of the piston are so proportioned that at no time the openings extend beyond the right hand end of the piston.

I have not shown the governor in great detail. Nor have I shown any but the simplest of link mechanism between the governor and the piston of my control valve. There is a great variety of governors obtainable commercially, each necessitating a somewhat different means of translating its dynamic action into the required motion of the control valve piston. Once adjusted to properly cooperate with my control valve, the principle of operation in conjunction therewith is identical.

Having described my invention, I claim:

1. In combination with a two cycle internal combustion engine having an air supply, an air control valve capable of releasing air fed into the engine intake, means for actuating the control valve in accordance with speed variations of the engine, and means cooperating with the air not released for proportionally adding fuel to the air not released by the control valve.

2. In an air control valve, the combination comprising a cylinder open at one end and closed at the other end, and having a spiral like slot forming an air release passage from the inside of the cylinder to the outside, a piston in the cylinder capable of covering the entire slot when in one position, and capable of sliding away from the portion of the cylinder having the slot, means for equalizing the pressure on both ends of the piston, and means for controlling the position of the piston.

3. In an air control valve, the combination comprising an air duct, a cylinder open at one end and closed at the other end and having a spiral slot in the cylinder wall, means for joining the cylinder open end to the air duct, a piston slideably fitted in the cylinder and capable of covering the slot when in one position and uncovering the slot when in another position, means for equalizing the pressure on both ends of the piston, said means comprising a tubular duct one end of which opens into the cylinder near its open end, and the other end opening into the cylinder near its closed end, and means for controlling the position of the piston in the cylinder.

4. In an air control valve, the combination comprising an air duct, a cylinder open at one end and closed at the other end and having a spiral slot in the cylinder walls, means for joining the open end to the air duct, a piston slideably fitted in the cylinder and having a piston rod extending through one end of the cylinder, said piston comprising two spaced discs mounted on the piston rod, said discs being slideably fitted in the cylinder and being spaced so that when the piston is in one extreme position, the slot in the cylinder wall is between the discs, and when in another extreme position the slot is wholly or partly between one disc and the open end of the piston.

5. In an air control valve, the combination comprising an air duct, a cylinder open at one end and closed at the other end and having a V-shaped slot in the cylinder wall and a groove in the cylinder wall extending along the length of the cylinder but not connected with the slot, a piston slideably fitted in the cylinder and capable of covering the slot when in one extreme position and capable of uncovering the slot when in another extreme position, and means for controlling the position of the piston.

6. In an air control valve, the combination comprising an air duct, a cylinder open at one end and closed at the other end and having a series of longitudinal slots in the cylinder wall, the ends of the slots nearer the open end of cylinder being staggered, a piston in the cylinder capable of covering the slots when in one extreme position and capable of uncovering the slots when in another extreme position, means for controlling the position of the piston in the cylinder, and means for equalizing the pressure on both ends of the piston.

7. The combination defined in claim 1, in which the means for adding fuel to the air comprises means operated by the air flow into the engine intake to open a fuel valve in proportion to the flow of air past the last means.

GEORGE ALLEN SPELTS.